US007465403B2

(12) United States Patent
Kim et al.

(10) Patent No.: US 7,465,403 B2
(45) Date of Patent: Dec. 16, 2008

(54) INK JET HEAD INCLUDING A METAL CHAMBER LAYER AND A METHOD OF FABRICATING THE SAME

(75) Inventors: Kyong-il Kim, Seoul (KR); Yong-shik Park, Seongnam-si (KR); Myong-jong Kwon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 251 days.

(21) Appl. No.: 11/063,993

(22) Filed: Feb. 24, 2005

(65) Prior Publication Data

US 2006/0037936 A1 Feb. 23, 2006

(30) Foreign Application Priority Data

Aug. 23, 2004 (KR) ...................... 10-2004-0066546

(51) Int. Cl.
*G01D 15/00* (2006.01)
*G11B 5/127* (2006.01)

(52) U.S. Cl. ........................... 216/27; 438/21; 29/890.1

(58) Field of Classification Search ................... 216/27; 438/21; 29/890.1
See application file for complete search history.

(56) References Cited

U.S. PATENT DOCUMENTS

| | | | | |
|---|---|---|---|---|
| 4,675,083 | A | 6/1987 | Bearss et al. | |
| 5,322,594 | A * | 6/1994 | Bol | 216/27 |
| 5,478,606 | A | 12/1995 | Ohkuma et al. | |
| 5,524,784 | A | 6/1996 | Shiba et al. | |
| 5,733,433 | A | 3/1998 | Lee et al. | |
| 6,022,482 | A | 2/2000 | Chen et al. | |
| 6,497,019 | B1 * | 12/2002 | Yun | 29/25.35 |
| 2003/0011659 | A1 * | 1/2003 | Ramaswami et al. | 347/61 |

FOREIGN PATENT DOCUMENTS

| | | |
|---|---|---|
| JP | 05-131636 | 5/1993 |
| JP | 08-187861 | 7/1996 |
| JP | 2001-38909 | 2/2001 |
| JP | 2001-162803 | 6/2001 |
| KR | 2004-33183 A | 4/2004 |

OTHER PUBLICATIONS

Wolf, Stanley; Tauber, Richard N. "Silicon Processing for the VLSI Era", vol. 1, pp. 408, 429; Lattice Press, 1986.*
Chinese Office Action dated Apr. 20, 2007 issued in Chinese Patent Application No. 200510088408X.
Japanese Office Action dated Jul. 29, 2008 issued in JP 2005-229967.

* cited by examiner

*Primary Examiner*—Roberts Culbert
(74) *Attorney, Agent, or Firm*—Stanzione & Kim, LLP

(57) ABSTRACT

A method of fabricating an ink jet head having a metal chamber layer includes preparing a substrate having pressure-generating elements to generate pressure to eject ink ejection. The metal chamber layer to define sidewalls of an ink flow path is then formed on the substrate. A sacrificial layer is formed to fill a region where the ink flow path is to be formed between the sidewalls defined by the metal chamber layer. A nozzle layer having nozzles corresponding to the pressure-generating elements is formed on the metal chamber layer and the sacrificial layer.

33 Claims, 7 Drawing Sheets

INK JET HEAD INCLUDING A METAL CHAMBER LAYER AND A METHOD OF FABRICATING THE SAME

CROSS-REFERENCE TO RELATED APPLICATIONS

This application claims the benefit of Korean Patent Application No. 2004-66546, filed Aug. 23, 2004, the disclosure of which is hereby incorporated herein by reference in its entirety.

BACKGROUND OF THE INVENTION

1. Field of the Invention

The present general inventive concept relates to an ink jet head and a method of fabricating the same, and more particularly, to an ink jet head including a metal chamber layer and a method of fabricating the same.

2. Description of the Related Art

An ink jet recording device functions to print an image by ejecting fine droplets of printing ink to a desired position on a recording medium. Ink jet recording devices have been widely used due to their inexpensive price and characteristics capable of printing numerous colors at a high resolution. The ink jet recording device includes an ink jet head for actually ejecting ink and an ink container in fluid communication with the ink jet head. The ink stored in the ink container is supplied into the ink jet head through an ink-feed passage, and the ink jet head ejects the ink supplied from the ink container to the recording medium to perform a printing operation.

A process of fabricating the ink jet head may be classified as a hybrid type or a monolithic type depending upon a method of forming a chamber layer and a nozzle layer of the ink jet head. According to the hybrid type the chamber layer and the nozzle layer having nozzles for ejecting ink are separately formed on a substrate having pressure generating elements thereon. The nozzle layer may be adhered to the chamber layer to fabricate the ink jet head. However, misalignment may occur between the pressure-generating elements and the nozzles during the process of adhering the nozzle layer to the chamber layer. In addition, the process may be complicated, since the chamber layer and the nozzle layer are manufactured through separate processes. On the other hand, a method of fabricating the ink jet head in accordance with the monolithic type can create the chamber layer and the nozzle layer such that the nozzles are precisely aligned with the pressure generating elements. In addition, the monolithic type is capable of decreasing a manufacturing cost and improving productivity by virtue of simplifying the manufacturing process by forming the chamber layer and the nozzle layer by the same process. Examples of methods of fabricating the ink jet head in accordance with the monolithic type are disclosed in U.S. Pat. Nos. 5,478,606, 5,524,784, and 6,022,482.

FIGS. 1 to 4 are cross-sectional views illustrating a method of fabricating a conventional monolithic type ink jet head.

Referring to FIG. 1, heat-generating resistors 102 for generating pressure for ink ejection are formed on a substrate 100. An insulating passivation layer 104 is formed on an entire surface of the substrate having the heat-generating resistors 102 thereon. Next, a chamber layer 106 defining sidewalls of an ink flow path is formed on the insulating passivation layer 104. The chamber layer 106 is conventionally formed of a negative photosensitive resin layer.

Referring to FIG. 2, a sacrificial material layer 108 is formed on the substrate 100 having the chamber layer 106 thereon. The sacrificial material layer 108 is formed of a soluble resin layer such as a positive photoresist. The sacrificial material layer 108 is then polished by a chemical mechanical polishing (CMP) method.

Referring to FIG. 3, as a result of performing the CMP process, a sacrificial layer 108' is formed between the sidewalls defined by the chamber layer 106 to cover a region where the ink flow path is to be formed. The sacrificial layer 108' is provided as a supporting layer for the nozzle layer to be formed by the following processes.

Referring to FIG. 4, a resin layer is formed on the chamber layer 106 and the sacrificial layer 108'. The resin layer is patterned to form the nozzle layer 112 having nozzles 112' corresponding to the heat-generating resistors 102, respectively. Then, the substrate 100 is etched to form an ink-feed passage 114, and the sacrificial layer 108' is then removed.

A height of the ink flow path is affected by a thickness of the chamber layer 106. Therefore, the thickness of the chamber layer 106 should be adjustable and precisely reproducible. In a method of fabricating the conventional monolithic ink jet head, in order to create the chamber layer 106 having a reproducible thickness, the chamber layer 106 is formed of a material layer having a polish selectivity (polishing rate of the sacrificial layer/polishing rate of the chamber layer) with respect to the sacrificial layer 108. In this case, the chamber layer 106 functions as a polish stop layer for detecting a polishing stop point of the CMP process. However, as described above, when both the chamber layer 106 and the sacrificial material layer 108 are formed of a resin material, it may be difficult to make the chamber layer 106 have a polish selectivity with respect to the sacrificial material layer 108. As a result, the chamber layer 106 does not function as the polish stop layer and is polished together with the sacrificial material layer 108, thereby making it difficult to adjust and precisely reproduce the thickness of the chamber layer 106. Additionally, although the sacrificial layer 108' may be formed by applying and patterning the positive photoresist without employing the above-mentioned CMP process, it may be difficult to form the sacrificial layer 108' having a flat top surface due to a step between the sacrificial material layer 108 and the chamber layer 106. This may make it difficult to form the ink flow path having uniform dimensions.

SUMMARY OF THE INVENTION

The present general inventive concept provides a method of fabricating an ink jet head having an ink flow path of uniform dimensions by forming a chamber layer having a precise and reproducible thickness.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing a method of fabricating an ink jet head having a metal chamber layer. The method may include preparing a substrate having pressure-generating elements to generate pressure to eject ink. The metal chamber layer to define sidewalls of an ink flow path may then be formed on the substrate. A sacrificial layer is formed to fill a region where the ink flow path is to be formed between the sidewalls defined by the metal chamber layer. A nozzle layer having nozzles corresponding to the pressure-generating elements is then formed on the metal chamber layer and the sacrificial layer.

The pressure-generating elements may be heat-generating resistors.

The method may further include forming a seed layer pattern on the substrate before forming the metal chamber layer. In this case, the metal chamber layer may be formed on the seed layer pattern by an electroplating method. The seed layer pattern may be formed by forming a seed layer on the substrate and patterning the seed layer. The seed layer may be formed of a metal layer containing at least one metal selected from a group including copper, platinum, gold, palladium, silver, and nickel. The metal chamber layer may be formed of a copper layer or a nickel layer. Other metals may also be used to form the metal chamber layer.

The method may further include forming a sacrificial material layer on the substrate after forming the seed layer pattern thereon. The sacrificial material layer may be patterned to form a sacrificial material layer pattern to cover the region where the ink flow path is to be formed and to expose the seed layer pattern. In this case, forming the sacrificial layer may include polishing the sacrificial material layer pattern using the metal chamber layer as a polish stop layer. The sacrificial material layer may be formed of a positive photoresist. In addition, polishing the sacrificial material layer pattern may be performed by a chemical mechanical polishing (CMP) process.

Alternatively, forming the sacrificial layer may include forming the sacrificial material layer to cover the metal chamber layer disposed on the substrate, and polishing the sacrificial material layer using the metal chamber layer as a polish stop layer.

The foregoing and/or other aspects and advantages of the present general inventive concept may also be achieved by providing an ink jet head having a metal chamber layer. The ink jet head includes a substrate having pressure-generating elements to generate pressure to eject ink. A metal chamber layer defining sidewalls of an ink flow path is disposed on the substrate. A nozzle layer having nozzles corresponding to the pressure-generating elements is disposed on the metal chamber layer to define an upper surface of the ink flow path.

The pressure-generating elements may be heat-generating resistors. The metal chamber layer may be a copper layer or a nickel layer. Other metals may also be used to form the metal chamber layer.

The ink jet head may further include a seed layer pattern interposed between the substrate and the metal chamber layer. The seed layer pattern may be a metal layer containing at least one metal selected from a group including copper, platinum, gold, palladium, silver, and nickel.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
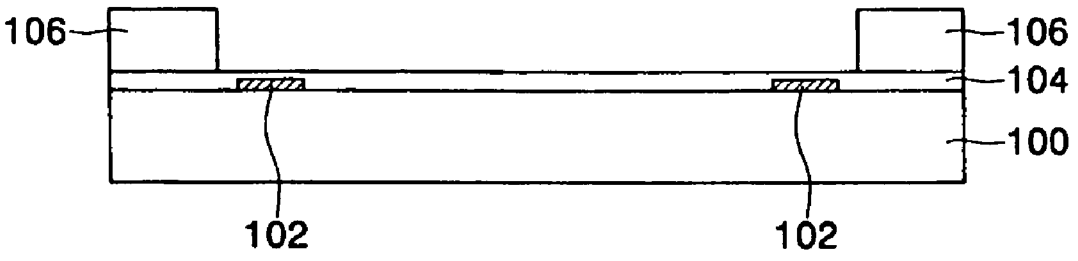
FIG. 1 (PRIOR ART)
FIGS. 1 to 4 are cross-sectional views illustrating a method of fabricating a conventional monolithic type ink jet head.
Figure 2:
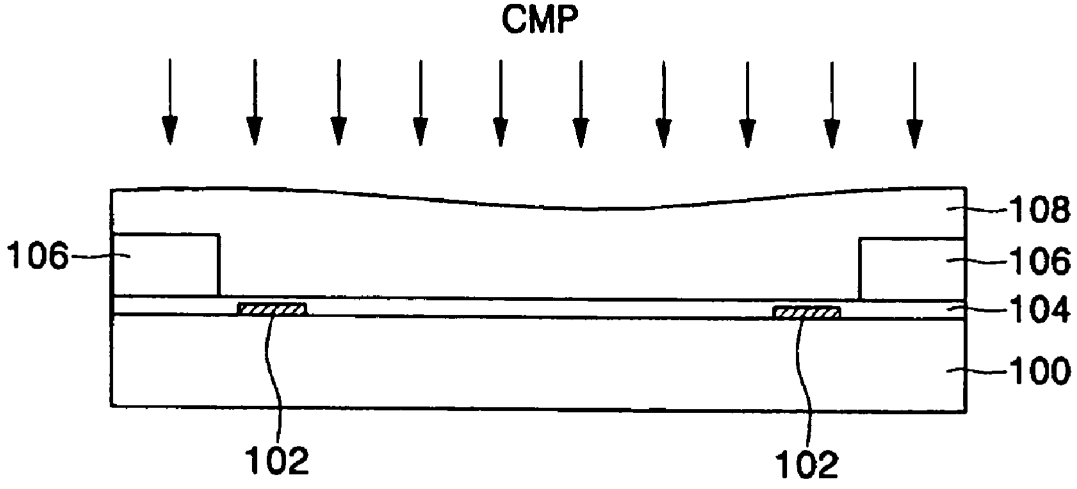
FIG. 2 (PRIOR ART)
Figure 3:
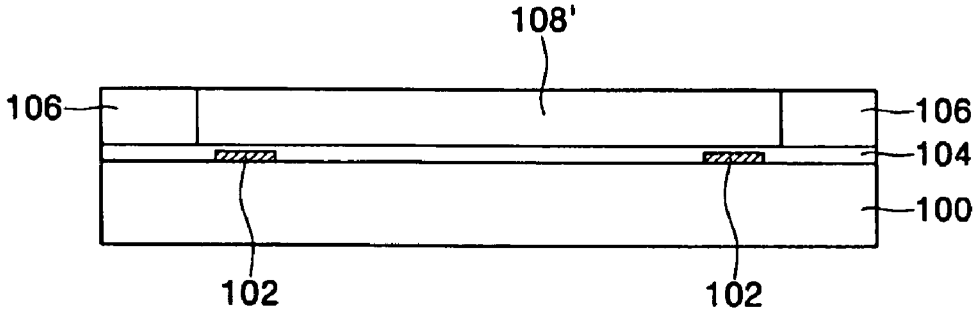
FIG. 3 (PRIOR ART)
Figure 4:
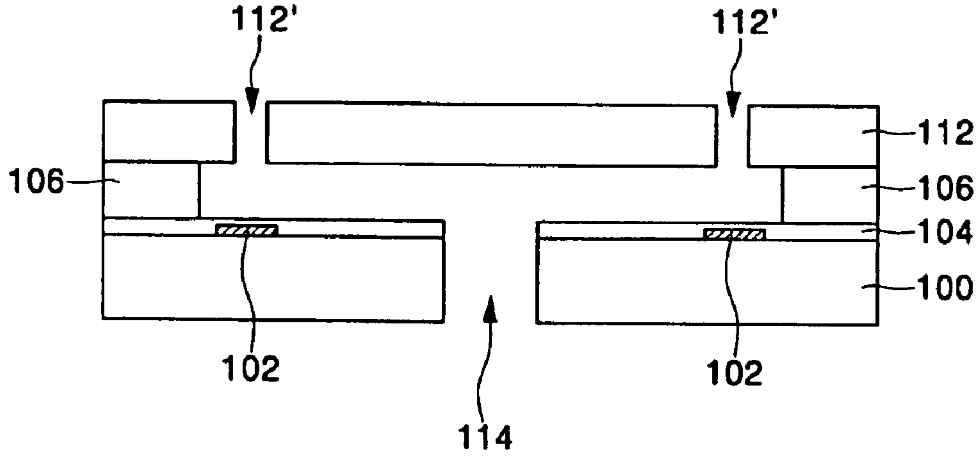
FIG. 4 (PRIOR ART)

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 5:
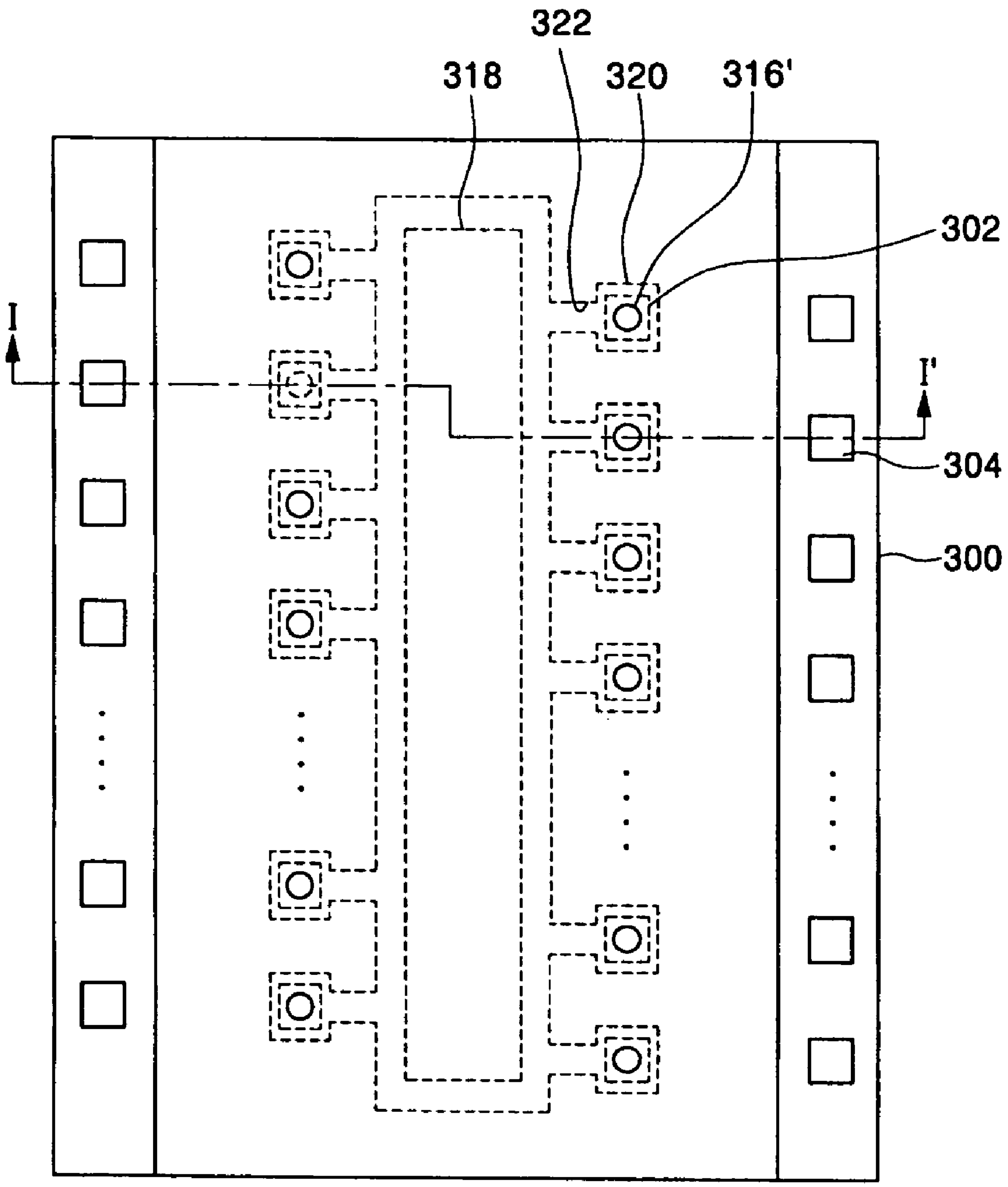
FIG. 5 is a schematic plan view illustrating an ink jet head according an embodiment of the present general inventive concept.

FIG. 5 is a schematic plan view of an ink jet head according to an embodiment of the present general inventive concept. FIGS. 6 to 12 are cross-sectional views, taken along the line I-I' of FIG. 5, illustrating a method of fabricating the ink jet head of FIG. 5 according to an embodiment of the present general inventive concept.

Figure 6:
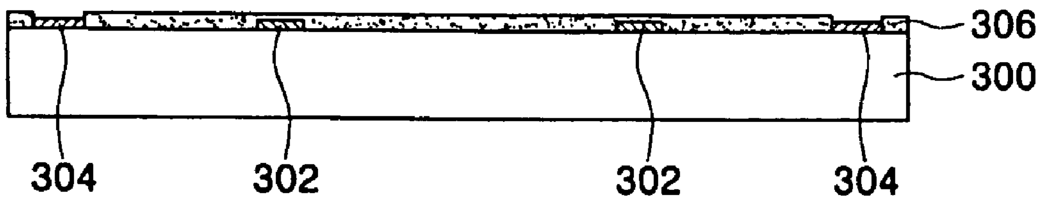
FIGS. 6 to 12 are cross-sectional views, taken along the line I-I' of FIG. 5, illustrating a method of fabricating the ink jet head of FIG. 5 according to an embodiment of the present general inventive concept.

Referring to FIGS. 5 and 6, a substrate 300 is prepared. The substrate 300 may be a silicon substrate used in a process of fabricating a semiconductor device and having a thickness of about 500 micrometers (μm). Pressure-generating elements 302 to generate pressure to eject ink are formed on the substrate 300. The pressure-generating elements 302 may be heat-generating resistors made of a high resistance metal such as tantalum or tungsten, an alloy containing the high resistance metal such as tantalum-aluminum, or poly-silicon having impurity ions doped therein. In addition, pads 304 that are electrically connected to an inner circuit of the ink jet head along both longitudinal sides of the substrate 300 may be formed on the substrate 300. The pads 304 may also be formed along both short sides of the substrate 300 according to a design specification. Wires to transmit electrical signals to the pressure-generating elements 302 may be formed on the substrate 300. Additionally, the pads 304 may be formed during the same process as the wires. An insulating passivation layer 306 may be formed on the substrate 300 having the pressure-generating elements 302 and the pads 304 disposed thereon. The insulating passivation layer 306 may be formed of a silicon nitride layer by a plasma enhanced chemical vapor deposition (PECVD) method.

Figure 7:
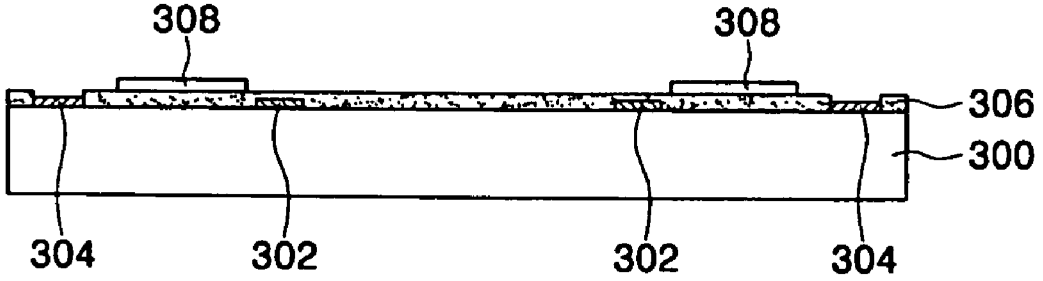

Referring to FIGS. 5 and 7, a seed layer pattern 308 is formed on the insulating passivation layer 306. More specifically, a seed layer is formed on the insulating passivation layer 306. The seed layer may be formed of a metal layer containing at least one metal selected from a group including copper (Cu), platinum (Pt), gold (Au), palladium (Pd), silver (Ag), and nickel (Ni). The seed layer may be formed by a physical vapor deposition (PVD) method or a chemical vapor deposition (CVD) method. The seed layer may then be patterned to form the seed layer pattern 308. The seed layer may be patterned by a conventional photolithography process and an anisotropic etching process. The seed layer pattern 308 may be formed to expose a region where an in ink flow path is to be formed. A metal chamber layer may then be formed on the seed layer pattern 308 by the following process.

Figure 8:
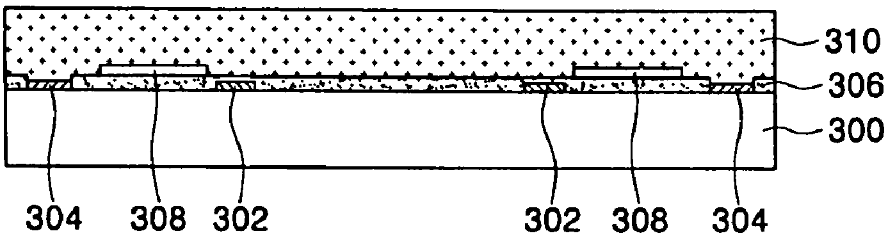

Referring to FIGS. 5 and 8, a sacrificial material layer 310 is formed on an entire surface of the substrate 300 having the seed layer pattern 308 disposed thereon. The sacrificial material layer 310 may be formed of a positive photoresist by a spin coating method. The sacrificial material layer 310 may have a thickness larger than that of a metal chamber layer, which is to be formed by the following process.

Figure 9:
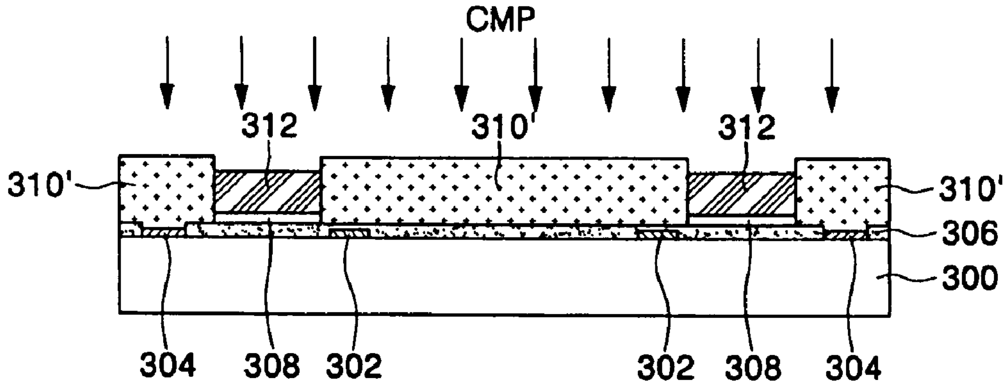

Referring to FIGS. 5 and 9, the sacrificial material layer 310 is patterned to form a sacrificial material layer pattern 310' to cover the region where the ink flow path is to be formed and to expose the seed layer pattern 308. More specifically, the sacrificial material layer 310 may be selectively exposed using a photo-mask having a shielding pattern to expose the seed layer pattern 308. The exposed portion of the sacrificial material layer 310 may then be developed to form the sacrificial material layer pattern 310'. Next, a metal chamber layer 312 is formed on the seed layer pattern 308. The metal chamber layer 312 may be formed by an electroplating method. Other methods may also be used to form the metal chamber layer 312. In this case, the metal chamber layer 312 may be formed of any metal. For example, the metal chamber layer 312 may be formed of a copper layer or a nickel layer. In this process, the seed layer pattern 308 functions as a conductive underlying layer, which is to be a path of electric current. The metal chamber layer 312 may have a thickness of about 10~30 micrometers (μm) according to a desired height of the ink flow path. The sacrificial material layer pattern 310' functions as a plating mold while forming the metal chamber layer 312. Therefore, the metal chamber layer 312 may be formed to have a stable shape in a space defined by the sacrificial material layer pattern 310' (i.e., the plating mold).

A portion of the sacrificial material layer pattern 310' that protrudes over a top surface of the metal chamber layer 312 may be removed by polishing. Polishing the sacrificial material layer pattern 310' may be performed by the chemical mechanical polishing (CMP) process. In this case, the metal chamber layer 312 functions as a polish stop layer. As described above, the metal chamber layer 312 is formed of a metal layer, unlike the sacrificial material layer pattern 310'. The metal chamber layer 312 has a greater rigidity than the sacrificial material layer pattern 310', which is formed of a resin layer such as a positive photoresist. A difference in rigidity makes the metal chamber layer 312 have a low polish selectivity with respect to the sacrificial material layer pattern 310'. The CMP process may be stably completed when the process reaches the top surface of the metal chamber layer 312. As a result, the metal chamber layer 312 is not polished together with the sacrificial material layer pattern 310', and the thickness of the metal chamber layer 312 can be adjusted and precisely reproduced.

Figure 10:
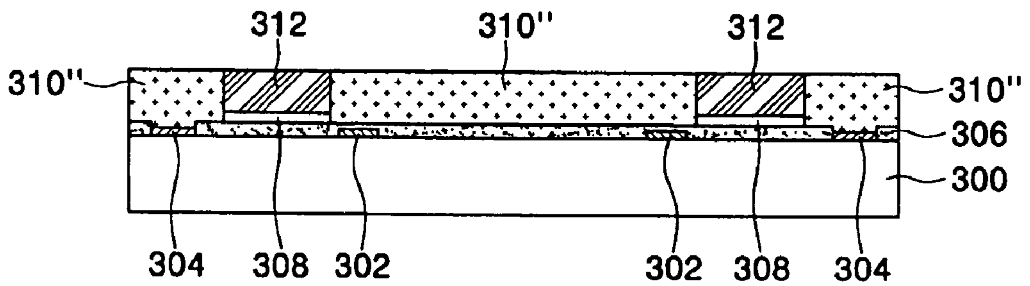

Referring to FIGS. 5 and 10, as a result of performing the CMP process, a sacrificial layer 310" may be formed to fill the region where the ink flow path is to be formed between the sidewalls defined by the metal chamber layer 312. The sacrificial layer 310" may be formed to have a flat top surface with no step to the metal chamber layer 312, since the sacrificial layer 310" is formed by the above-mentioned CMP process. As illustrated in FIG. 10, the sacrificial layer 310" also remains on the pads 304 located at both sides of the substrate 300.

Figure 11:
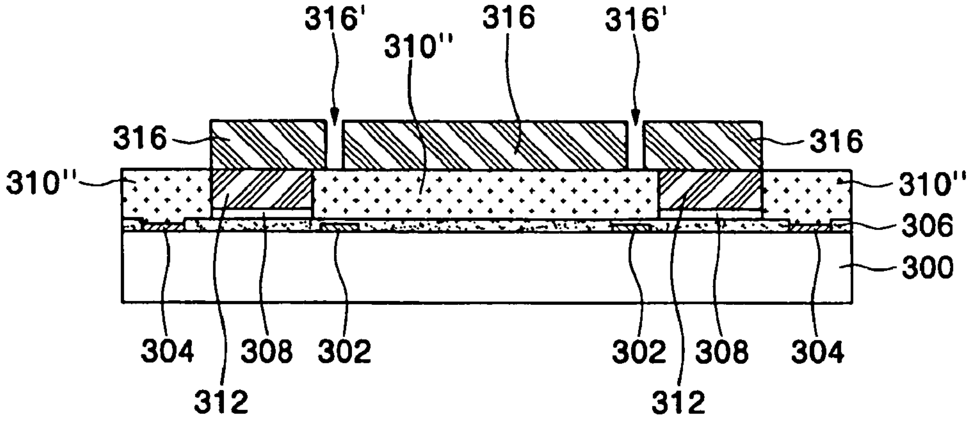

Referring to FIGS. 5 and 11, after forming the sacrificial layer 310", a nozzle material layer is formed on the metal chamber layer 312 and the sacrificial layer 310". The nozzle material layer may be formed of a photo-curable resin layer or a thermosetting resin layer by a spin coating method. For example, the nozzle material layer may be formed of an epoxy-based, a polyimide-based, or a polyacrylate-based resin layer. The nozzle material layer is then patterned to form a nozzle layer 316 having nozzles 316' located above the pressure-generating elements 302. When the nozzle material layer is a negative photosensitive resin layer, the negative photosensitive resin layer may be patterned by exposure and development processes. Alternatively, when the nozzle material layer is the thermosetting resin layer, the thermosetting resin layer may be patterned by a photolithography process and an anisotropic etching process using oxygen plasma.

Figure 12:
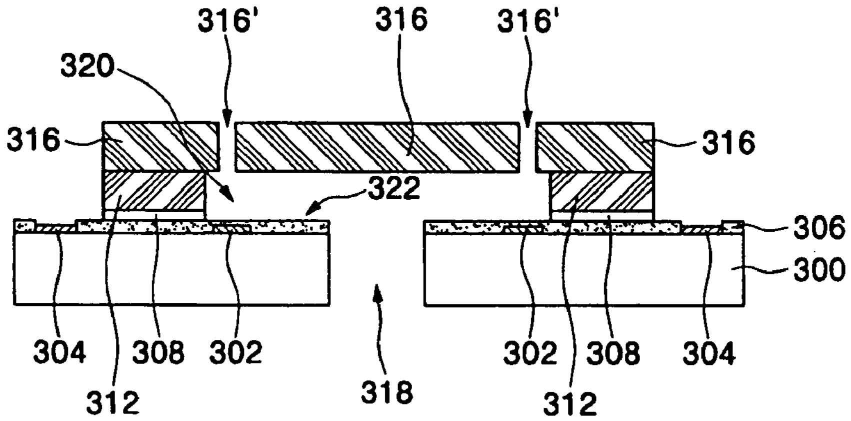

Referring to FIGS. 5 and 12, after forming the nozzle layer 316, an ink-feed passage 318 is formed to extend through the substrate 300 adjacent to the pressure-generating elements 302. As illustrated in FIG. 5, the ink-feed passage 318 may be formed to have a slot shape extending through a center of the substrate 300. In this case, the ink-feed passage 318 may be formed by creating a mask pattern exposing the center of the substrate 300 in a line shape at a bottom surface of the substrate 300, and etching the substrate 300 using the mask pattern as an etch mask. The substrate 300 may be etched by a dry etching method using plasma or a wet etching method using an etchant. The sacrificial layer 310" is then dissolved and removed. When the sacrificial layer 310" is a positive photoresist, the sacrificial layer 310" may be removed using a solvent, such as glycol ether, methyl lactate, or ethyl lactate. As a result of removing the sacrificial layer 310", the ink flow path including ink chambers 320 and ink channels 322 is formed at a region from which the sacrificial layer 310" is removed.

Figure 13:
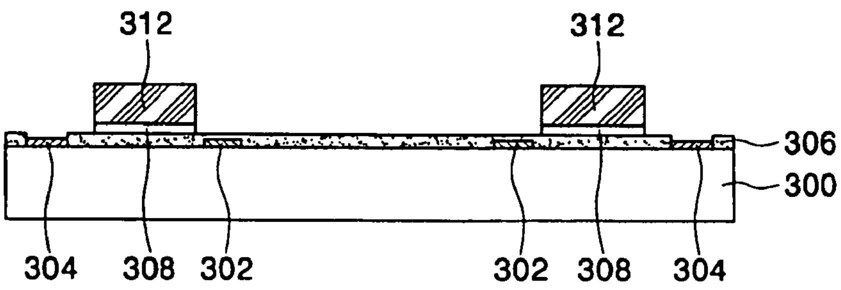
FIGS. 13 and 14 are cross-sectional views illustrating a method of fabricating the ink jet head of FIG. 5 according to another embodiment of the present general inventive concept.
Figure 14:
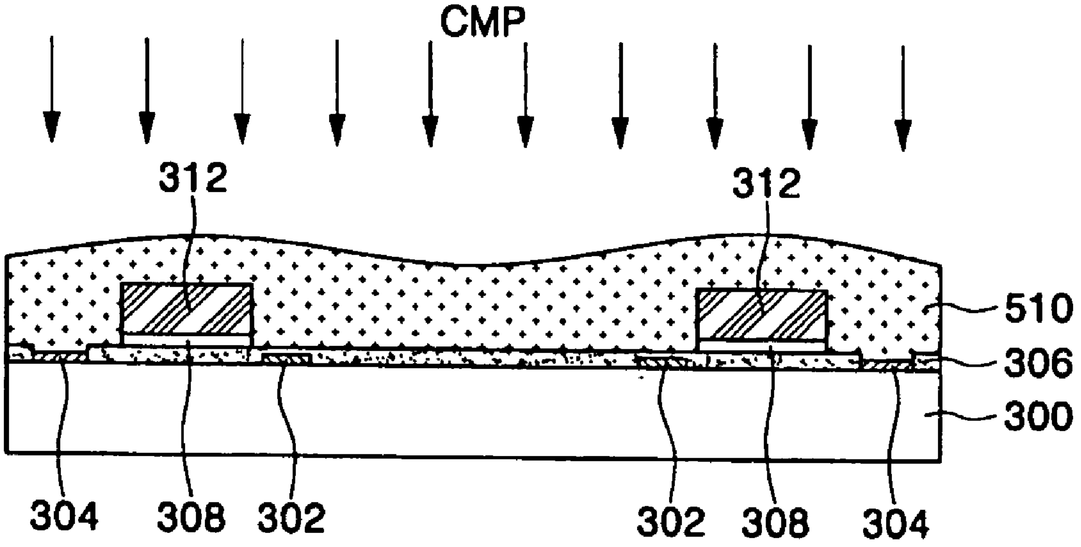

FIGS. 13 and 14 are cross-sectional views illustrating a method of fabricating the ink jet head of FIG. 5, according to another embodiment of the present general inventive concept.

Referring to FIG. 13, pressure-generating elements 302, pads 304, an insulating passivation layer 306, and a seed layer pattern 308 may be formed on a substrate 300 by performing similar processes to those described with reference to FIGS. 6 and 7. A metal chamber layer 312 is then formed.

Referring to FIG. 14, a sacrificial material layer 510 is formed on an entire surface of the substrate 300 to cover the metal chamber layer 312. The sacrificial material layer 510 may be formed of a positive photoresist by a spin coating method. Then, the sacrificial material layer 510 is polished to expose the top surface of the metal chamber layer 312. Polishing the sacrificial material layer 510 may be performed by a chemical mechanical polishing (CMP) process. The metal chamber layer 312 functions as a polish stop layer. In this manner, a sacrificial layer (similar to 310" of FIGS. 10 and 11) may be formed by performing this CMP process to the sacrificial material layer 510. A structure formed by completing the CMP process has the same shape as a structure illustrated in FIG. 10. The ink jet head is then manufactured by performing the same processes described with reference to FIGS. 11 and 12. By omitting the patterning process of the sacrificial material layer 510, the ink jet head can be manufactured by a simpler process.

Hereinafter, referring back to FIGS. 5 and 12, an ink jet head according to an embodiment of the present general inventive concept will be described.

Referring to FIGS. 5 and 12, the pressure-generating elements 302 to generate pressure to eject ink are formed on the substrate 300. The pressure-generating elements 302 may be heat-generating resistors made of a high resistance metal such as tantalum or tungsten, an alloy containing a high resistance metal such as tantalum-aluminum, or poly-silicon having impurity ions doped therein. As illustrated in FIG. 5, the pressure-generating elements 302 may be disposed in two rows on the substrate 300. The pressure-generating elements 302 may also be disposed in other arrangements. The pads 304 that are electrically connected to the inner circuit of the ink jet head along both longitudinal sides of the substrate 300 may be disposed on the substrate 300. The pads 304 may also be disposed along both lateral sides of the substrate 300 according to a design specification. The insulating passivation layer 306 may be formed on the substrate 300 having the pressure-generating elements 302 and the pads 304 disposed thereon. The insulating passivation layer 306 may be formed of a silicon nitride layer. The ink-feed passage 318 extends through the substrate 300 and the insulating passivation layer 306 and is disposed at a center of the substrate 300. The ink-feed passage 318 may be disposed to have a slot shape between the pressure-generating elements 302 disposed in the two rows as illustrated in FIG. 5.

The metal chamber layer 312 is disposed on the substrate 300 having the insulating passivation layer 306 thereon. The metal chamber layer 312 defines the sidewalls of the ink flow path. The seed layer pattern 308 is interposed between the substrate 300 and the metal chamber layer 312. The metal chamber layer 312 may be formed by an electroplating process using the seed layer pattern 308 as a conductive underlying layer. The metal chamber layer 312 may be a copper layer or a nickel layer. The seed layer pattern 308 may be a metal layer containing at least one metal selected from a group including copper (Cu), platinum (Pt), gold (Au), palladium (Pd), silver (Ag), and nickel (Ni). The nozzle layer 316 is disposed on the metal chamber layer 312. The nozzle layer 316 defines an upper surface of the ink flow path. The ink flow path includes the ink chambers 320 and the ink channels 322. In addition, the nozzle layer 316 includes the nozzles 316' corresponding to the pressure-generating elements 302, respectively. The nozzle layer 316 may be a photo-curable resin layer or a thermosetting resin layer. In this case, the nozzle layer 316 may be an epoxy-based, a polyimide-based, or a polyacrylate-based resin layer.

A bottom surface of the substrate 300 is attached to an ink container (not shown). Ink in the ink container is supplied through the ink-feed passage 318 extending through the substrate 300 and via the ink channels 322 to the ink chambers 320 where it is temporarily stored. The ink stored in the ink chambers 320 is instantly heated by the heat generating resistors (i.e., the pressure-generating elements 302) to be ejected through the nozzles 316' in a droplet shape by the pressure generated.

As can be seen from the foregoing, a method of fabricating an ink jet head in accordance with the present general inventive concept is provided with a chamber layer defining sidewalls of an ink flow path, the chamber layer being formed of a metal layer having a high polish selectivity with respect to a resin layer. As a result, the ink jet head having the ink flow path of uniform dimensions can be manufactured by forming the chamber layer having a precisely reproducible thickness.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of fabricating an ink jet head, the method comprising:

preparing a substrate having pressure-generating elements to generate pressure to eject ink;

forming a metal chamber layer to define sidewalls of an ink flow path on the substrate;

forming a sacrificial layer to fill a region where the ink flow path is to be formed between the sidewalls defined by the metal chamber layers; and forming a nozzle layer having nozzles corresponding to the pressure-generating elements on the chamber layer and the sacrificial layer, wherein the forming of the sacrificial layer comprises polishing the sacrificial material layer pattern using the metal chamber layer as a polish stop layer.

2. The method according to claim 1, wherein the pressure-generating elements comprise heat-generating resistors.

3. The method according to claim 1, further comprising: forming a seed layer pattern on the substrate before forming the metal chamber layer such that the metal chamber layer is formed on the seed layer pattern.

4. The method according to claim 3, wherein the metal chamber layer is formed by an electroplating method.

5. The method according to claim 3, wherein the forming of the seed layer pattern comprises:

forming a seed layer on the substrate; and patterning the seed layer.

6. The method according to claim 5, wherein the seed layer is formed of a metal layer containing at least one metal selected from a group consisting of copper, platinum, gold, palladium, silver, and nickel.

7. The method according to claim 3, wherein the metal chamber layer is formed of one of a copper layer and a nickel layer.

8. The method according to claim 3, further comprising:

forming a sacrificial material layer on the substrate after forming the seed layer pattern; and patterning the sacrificial material layer to form a sacrificial material layer pattern to cover the region where the ink flow path is to be formed and to expose the seed layer pattern.

9. The method according to claim 8, wherein the sacrificial material layer pattern is used as a plating mold to form the metal chamber layer on the seed layer pattern by electroplating.

10. The method according to claim 8, wherein the sacrificial material layer is formed of a positive photoresist.

11. The method according to claim 1, wherein the polishing of the sacrificial material layer pattern is performed by a chemical mechanical polishing process.

12. The method according to claim 3, wherein the forming of the sacrificial layer comprises forming a sacrificial material layer to cover the metal chamber layer on the substrate.

13. The method according to claim 12, wherein the sacrificial material layer is formed of a positive photoresist.

14. The method according to claim 13, wherein the polishing of the sacrificial material layer pattern is performed by a chemical mechanical polishing process.

15. The method according to claim 1, further comprising:

etching the substrate adjacent to the pressure-generating elements to form an ink-feed passage extending through the substrate; and dissolving and removing the sacrificial layer.

16. A method of fabricating an ink jet head, the method comprising:

forming a metal chamber layer on a substrate having one or more pressure generating elements disposed thereon to define sidewalls of an ink flow path;

forming a sacrificial mold layer to fill a region at which the ink flow path is to be formed; and forming a nozzle layer having one or more nozzles to correspond to the pressure generating elements on the metal chamber layer and to define an upper surface of an ink flow path, wherein the sacrificial mold layer is polished using the metal chamber layer as a polish stop layer, before forming the nozzle layer.

17. The method according to claim 16, wherein the forming of the sacrificial mold layer comprises forming a sacrificial mold layer having one or more mold regions by forming a sacrificial material layer and patterning the sacrificial material layer, and the forming of the metal chamber layer comprises depositing metal in the one or more mold regions of the sacrificial mold layer.

18. The method according to claim 17, wherein the polishing of the sacrificial mold layer comprises polishing the sacrificial mold layer until the metal chamber layer is reached using the metal chamber layer as a polish stop layer.

19. The method according to claim 18, wherein the metal chamber layer has greater rigidity than the sacrificial mold layer.

20. The method according to claim 18, wherein the polishing of the sacrificial mold layer is performed by a chemical mechanical polishing method.

21. The method according to claim 17, wherein the sacrificial material layer is formed of a photoresist by a spin coating method.

22. The method according to claim 17, further comprising:
forming an ink-feed passage extending through the substrate adjacent to the one or more pressure generating elements and to be in fluid communication with the ink flow path; and
dissolving and removing the sacrificial mold layer.

23. The method according to claim 16, wherein the metal chamber layer is formed by an electroplating process.

24. The method according to claim 16, wherein the polishing of the sacrificial mold layer comprises polishing the sacrificial mold layer until the metal chamber layer is reached and using the metal chamber layer as a polish stop layer so that a top surface of the polished sacrificial mold layer and a top surface of the metal chamber layer are coplanar.

25. The method according to claim 24, wherein the polishing of the sacrificial material layer is performed by a chemical mechanical polishing method.

26. The method according to claim 24, wherein the forming of the sacrificial mold layer is formed of a photoresist by a spin coating method.

27. The method according to claim 16, further comprising:
before forming the metal chamber layer, preparing the substrate having the one or more pressure generating elements disposed thereon; and
forming a passivation layer over a surface of the substrate having the one or more pressure generating elements disposed thereon.

28. The method according to claim 27, further comprising:
before forming the metal chamber layer, forming a seed pattern layer on the passivation layer having seed portions to correspond to the sidewalls to be defined by the metal chamber layer by depositing a seed layer and patterning the seed layer.

29. The method according to claim 28, wherein the seed layer comprises at least one of copper, platinum, gold, palladium, silver, and nickel.

30. The method according to claim 27, wherein the preparing of the substrate further comprises providing one or more pads on the substrate to communicate with an internal circuit, the one or more pads disposed along longitudinal sides of the substrate.

31. A method of fabricating an inkjet head, the method comprising:
forming a chamber layer of a metal on a substrate having one or more pressure generating elements disposed thereon and to define sidewalls of an ink flow path;
forming a sacrificial layer of a resin on the substrate to cover the chamber layer and to fill a region where the ink flow path is to be formed;
polishing the sacrificial layer using the chamber layer as a polish stop; and
forming a nozzle layer having one or more nozzles corresponding to the one or more pressure generating elements.

32. A method of fabricating an inkjet head, the method comprising:
forming a sacrificial mold layer of a second material having one or more mold regions on a substrate having one or more pressure generating elements disposed thereon and to fill a region where an ink flow path is to be formed;
forming a chamber layer of a first material to define sidewalls of the ink flow path by depositing the first material in the one or more mold regions;
polishing the sacrificial mold layer using the chamber layer as a polish stop such that the first material is not polished together with the second material during the polishing of the sacrificial mold layer; and
forming a nozzle layer having one or more nozzles corresponding to the one or more pressure generating elements.

33. The method according to claim 32, wherein the first material is a metal and the second material is a resin.

* * * * *